United States Patent Office 3,461,157
Patented Aug. 12, 1969

3,461,157
PROCESS FOR THE OXIDATION OF OLEFINS WITH A PLATINUM GROUP METAL CATALYST
Kenneth L. Olivier, Placentia, and William D. Schaeffer, Pomona, Calif., assignors to Union Oil Company of California, Los Angeles, Calif., a corporation of California
Filed May 27, 1966, Ser. No. 553,454
Int. Cl. C07c *67/00;* B01j *11/04*
U.S. Cl. 260—497                                     15 Claims

ABSTRACT OF THE DISCLOSURE

In the oxidation of olefins in a liquid reaction medium comprising a platinum group metal catalyst and a redox agent, the improved method of regenerating the catalyst by removing a portion of the reaction medium, separating a tarry fraction from the medium, contacting the tarry fraction with oxygen in a combustion chamber and returning the inorganic ash product to the reaction zone.

---

Figure 1:
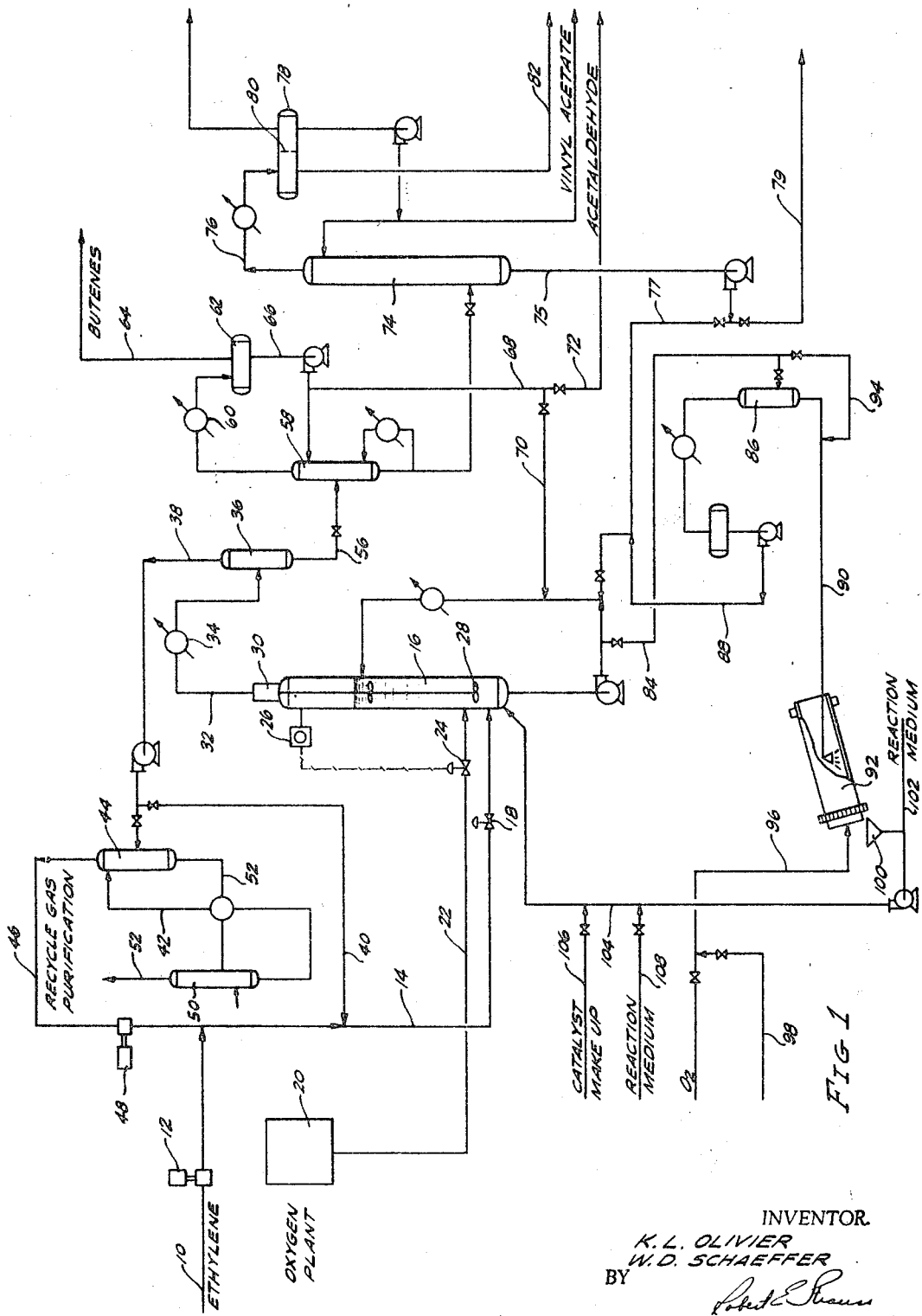

This invention relates to a method for the recovery of catalyst from reaction media that have been employed for the liquid phase oxidation of olefins to valuable oxygenated compounds and in particular relates to the recovery of the metal catalyst salts including a platinum group metal and redox metal salts employed in such oxidation.

A recent development in the preparation of oxygenated compounds from olefins has been the development of the liquid phase oxidation processes which employ a platinum group metal salt as a catalyst for the oxidation. This oxidation is performed in anhydrous or substantially anhydrous organic reaction media and involves the formation of an olefin complex with a soluble salt of the platinum metal, e.g., palladium chloride, which at the reaction temperature, decomposes in the presence of the reaction solvent to form an unsaturated ester of the carboxylic acid solvent. When this reaction is performed in the presence of carbon monoxide according to the method disclosed in application Ser. No. 371,751, now Patent 3,381,030, the olefin is oxidatively carbonylated to prepare an alpha-beta unsaturated carboxylic acid or to prepare a beta acetoxy alkanoic acid.

The reaction is performed in the presence of a substantially anhydrous organic reaction medium. The reaction medium should contain a low molecular weight carboxylic acid although the majority of the reaction media can be any other inert organic liquid having the solvency for the catalyst components and the olefin being oxidized. The reaction is performed under substantially anhydrous conditions and, accordingly, the reaction medium should contain less than about 10 weight percent water. In the oxidative carbonylation hereinafter described, it is preferred that the reaction be performed under entirely anhydrous conditions since the presence of the water will promote less desired reactions.

The olefin is oxidized to one or several products, depending upon the reaction medium and the reaction conditions. Unsaturated esters of the carboxylic acid employed in the reaction medium are generally prepared when the olefin is contacted with the substantially anhydrous reaction medium containing the carboxylic acid. To the extent that water is present or formed during the oxidation process, the olefin will also be oxidized to a carbonyl, i.e., aldehyde or ketone. In this manner ethylene can be oxidized in high yields to vinyl acetate as the major product with, depending upon the amount of water present, minor amounts of acetaldehyde. In the oxidative carbonylation reaction the olefin can be oxidized and carbonylated in a single reaction zone to prepare high yields of alpha,beta-unsaturated carboxylic acids or beta-acyloxy carboxylic acids. In this process, carbon monoxide is introduced simultaneously with the olefin to contact the reaction medium. Acrylic acid and beta-acetoxy propionic acid can be achieved in high yields from ethylene and carbon monoxide according to this process.

The oxidation of the olefin reduces a stoichiometric quantity of the cations of the platinum group metal to a lower valency, generally to the free metal state. To provide a commercially attractive process, various redox agents are included in the recation medium to provide an oxidizing environment which will restore the reduced platinum group metal to the ionic state for reuse in the oxidation. These redox metals are themselves reduced to a lower valency state and, when substantially all the quantities of redox agent have been reduced to a lower valency, it is necessary to reoxidize the catalyst to its higher valency state.

The oxidation of the catalyst to restore the catalyst to its higher valency is accomplished with molecular oxygen. The oxygen can be introduced simultaneously into the reaction zone to oxidize the catalyst in situ and this is the preferred technique, particularly when the oxidative carbonylation reaction is practiced. In other embodiments the reduced solution can be withdrawn from the reaction zone and, with or without product recovery, passed to a second reaction zone wherein it is contacted with oxygen.

After the oxidation has been performed for a considerable length of time and the reaction medium has been used repeatedly, there accumulates an objectionable quantity of high-boiling material in the reaction medium. To maintain activity of the reaction medium for the desired oxidation, it is necessary to withdraw a portion of the reaction medium and replenish the medium with fresh solution and catalyst salts. The withdrawn portion of the reaction medium, however, contains a substantial quantity of the catalyst. For economical processing it is necessary to recover the catalyst for reuse in the oxidation. Efficient recovery of the catalyst is difficult because of the nature of the contaminants in the reaction medium; these are generally high-boiling tarry fractions which interfere with most extraction or separation techniques.

It is an object of this invention to provide an efficient method for the recovery of catalyst from the reaction medium employed for the oxidation of olefins.

It is likewise a purpose of this invention to provide an efficient and continuous method for the catalytic oxidation of olefins.

It is a specific object of this invention to provide a method for the recovery of platinum group metal values from an organic reaction medium.

It is a further object of this invention to provide a technique which recovers the catalyst in a suitable form for the direct recycling to the reaction zone.

Other and related objects will be apparent from the following description of the invention.

We have now found that the catalyst can be readily obtained for reuse in the oxidation process simply by removing from 1 to 20 weight percent of the reaction medium from the remainder of the reaction medium, contacting the withdrawn portion with oxygen and initiating combustion thereof to provide an ash which, surprisingly, retains its catalytic activity when returned directly to the reaction medium. Preferably, the portion of the reaction medium removed from the major body of the reaction medium is separated into a viscous tar fraction and a low viscosity liquid, and the latter is returned to the remainder of the reaction medium and only the viscous tar fraction is burned to obtain the catalytically active ash therefrom.

The combustion of the reaction medium can be achieved by placing the reaction medium in a shallow pan or container, placing the container in a suitable furnace and introducing oxygen and a source of ignition, e.g., an open flame, into contact with the reaction medium to burn this material. Preferably, relatively quiescent conditions are used to avoid spattering of the liquid contents and loss of the valuable ash. If desired, the reaction medium can be first subjected to destructive distillation to recover organic values therefrom and provide a coked residue which is thereafter oxidized. In this embodiment, the reaction medium is heated to relatively high temperatures in the absence of oxygen and the volatilized components thereof are collected and condensed as products or are used as a fuel to heat the reaction medium to the desired temperature. In either processing technique the reaction medium is reduced to an inorganic ash which can be directly returned to the reaction medium for reuse in the oxidation process.

As previously mentioned, the oxidation is performed with a hydrocarbon olefin which has from 2 to about 10 carbons, preferably from 2 to about 5 carbons. Examples of suitable olefins include ethylene, propylene, butene, pentene, hexene, heptene, octene, cyclohexene, methylcyclohexene, isopropylcyclohexene, etc. The aliphatic hydrocarbon olefins are preferred, particularly those having from 2 to about 5 carbons and of these ethylene is the most preferred because of the established market values of its products, i.e., vinyl acetate, acetaldehyde and/or acrylic acid.

The reaction is performed under liquid phase conditions in the presence of an organic liquid which has a solvency for the catalyst and which, preferably, is inert to the reaction conditions. Various organic liquids can be employed for this purpose such as sulfones, amides, ketones, ethers and esters. The carboxylic acids of the low molecular weight fatty acids or benzene carboxylic acids can also be employed as solvents.

Illustrative of organic solvents that can be employed include alkyl and aryl sulfones such as diisopropyl sulfone, butylamyl sulfone, methylbenzyl sulfone, etc. Another class of organic solvents that have a solvency for the catalyst salts and that are inert to the oxidation conditions are amides such as formamide, N,N-dimethyl formamide, N,N-ethylisopropyl formamide, acetamide, N-phenyl acetamide, N,N-dipropyl acetamide, isobutyramide, N-ethylisobutyramide, isovaleramide, N,N-dimethylisovaleramide, isocaprylamide, N,N-methyl-n-caprylamide, N-propyl-n-heptanoylamide, isoundecylamide, etc.

Various alkyl and aryl ketones can also be employed as a reaction solvent, e.g., acetone, methylethyl ketone, diethyl ketone, diisopropyl ketone, ethyl n-butyl ketone, methyl n-amyl ketone, cyclohexanone, diisobutyl ketone, etc.

Ethers can also be employed as a reaction solvent, e.g., diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, dichloroethyl ether, ethylene glycol diisoamyl ether, diethylene glycol diethyl ether, ethylbenzyl ether, diethylene glycol diethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Various esters can also be employed as a solvent, e.g., ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl malonate, valerolactone, ethyl benzoate, methyl salicylate, n-propyl benzoate, n-dibutyl oxalate, n-butyl benzoate, diisoamyl phthalate, dimethyl phthalate, diethyl phthalate, benzyl benzoate, n-dibutyl phthalate, etc.

The reaction medium should contain a low molecular weight alkanoic acid in an amount from about 10 to about 50 weight percent. If desired, the low molecular weight acid can be used as the entire reaction medium and this is the preferred embodiment. Illustrative of alkanoic acids which are useful in the reaction are acetic, propionic, butyric, isobutyric, pentanoic, hexanoic, heptanoic, isooctanoic, etc. Of these, the fatty carboxylic acids having from about 2 to about 5 carbons are preferred. The alkanoic acids are not entirely inert under the oxidation conditions in that the oxidation of ethylene in the absence of carbon monoxide results in the formation of an unsaturated ester of the alkanoic acid. In the presence of carbon monoxide and under anhydrous conditions the alkanoic acid also tends to add across the olefinic bond to provide a beta-acyloxy substituted product. the pyrolysis of the product produces the desired alpha,beta-unsaturated acid and the alkanoic acid which can be returned to the oxidation zone. Of the aforementioned alkanoic acids, acetic is, of course, the most preferred, because of the established market values of its products, i.e., vinyl and propenyl acetates.

In the oxidative carbonylation it is desirable to initiate the olefin reaction in the presence of an acid anhydride such as the anhydride of a low-boiling alkanoic acid, e.g., acetic, propionic, butyric, isobutyric, valeric, etc. Anhydrides of higher boiling acids and mixed acid anhydrides can also be used, e.g., pivalic, acetic-pivalic, lauric, etc. The oxidative carbonylation is preferably initiated in the presence of a reaction medium containing from 10 to 100 percent of a carboxylic acid with from 1 to 50 weight percent of the acid present as the anhydride. The oxidative carbonylation is also preferably performed with a mixture of a low boiling alkanoic acid having from 1 to about 4 carbons with a higher boiling alkanoic acid having from 4 to about 20 carbons. An example of the preferred mixture for oxidative carbonylation of ethylene is acetic acid 10 to 500 parts, pivalic acid 100 to 1000 parts, anhydrides of the acids 10 to 500 parts. The higher boiling pivalic acid serves as a vehicle for the catalyst and anhydride during distillation of the product (acrylic acid) and the lower boiling acetic acid is recovered as a distillate and recycled to improve the rate of reaction.

As previously mentioned, the reaction medium should contain catalytic amounts of a platinum group metal. The platinum group metal can be of the palladium subgroup or the platinum subgroup, i.e., palladium, rhodium, or ruthenium or platinum, osmium, or iridium. While all of these metals are active for the reaction, we prefer palladium because of its demonstrated greater activity. The platinum group metal can be employed in amounts between about 0.001 and about 5 weight percent of the liquid reaction medium; preferably between about 0.04 and about 2.0 weight percent. The platinum group metal can be added to the reaction medium as a finely divided metal, as a soluble salt or as a chelate. Preferably, the metal in its most oxidized form, i.e., as a soluble salt or chelate, is introduced into the reaction zone to avoid the formation of undesired quantities of water. Examples of suitable salts are the halides and carboxylates of the metals such as platinum chloride, rhodium acetate, ruthenium bromide, osmium propionate, iridium benzoate, palladium isobutyrate, etc. Examples of suitable chelates are palladium acetylacetonate, and complexes of the palladium group metal ions with such conventional chelating agents as ethylene diamine tetraacetic acid, citric acid, etc.

To facilitate the rate of oxidation by rendering it more facile to oxidize the reduced form of the platinum metal, we prefer to employ a reaction medium that contains a soluble halide, i.e., a bromide or chloride. The halide can be added as elemental chlorine or bromine; however, it is preferred to employ less volatile halides such as hydrogen, alkali metal or ammonium halides, e.g., hydrogen chloride; hydrogen bromide, cesium chloride, potassium bromide, lithium chlorate; ammonium bromide, ammonium chloride, etc. Also, any of the aforementioned platinum group metals can be added to supply a portion of the bromide or chloride and, when the hereafter mentioned multivalent redox salts are employed, these too can be added as a chloride or bromide.

In general, sufficient of any of the aforementioned soluble halides can be added to provide between about 0.005 and about 5.0 weight percent halide in the reaction zone; preferably concentrations between about 0.1 and about 3.0 weight percent are employed. This amount of halide is preferably also in excess of the stoichiometric quantity necessary to form the halide of the most oxidized state of platinum group metal, e.g., in excess of two atomic weights of halide per atomic weight of palladium present. In this manner, a rapid oxidation can be achieved.

When the oxidation is for the preparation of vinyl acetate, the reaction medium also contains from 0.1 to 5.0 weight percent of an alkali metal acetate.

As previously mentioned, various redox compounds can optionally be used in the reaction medium to accelerate the rate of reaction. In general, any multivalent metal salt having an oxidation potential higher, i.e., more positive than the platinum metal in the solution can be used. Typical of such are the soluble salts of the multivalent metal ions such as the carboxylates, e.g., propionates, benzoates, acetates, etc.; nitrates; sulfates; halides, e.g., bromides, chlorides, etc.; of copper and iron, mercury, nickel, cerium, vanadium, bismuth, tantalum, chromium or molybdenum. Of these, cupric salts are most preferred. In general, the multivalent metal ion salt is added to the reaction medium to provide a concentration of the metal therein between about 0.1 and about 10 weight percent; preferably between about 0.5 and about 3.0 weight percent.

Various other oxidizing agents can also be employed to accelerate the rate of reaction. Included in such agents are the nitrogen oxides that function as redox agents similar to those previously described. These nitrogen oxides can be employed as the only redox agent in the reaction medium or they can be employed jointly with one or more of the aforedescribed redox metal salts such as a combination of a nitrogen oxide and a cupric redox agent or ferric redox agent. In general, between about 0.01 and about 3 weight percent of the reaction medium; preferably between about 0.1 and about 1 weight percent; calculated as nitrogen dioxide can comprise a nitrogen oxide that is added as a nitrate or nitrite salt or nitrogen oxide vapors. The nitrogen oxides can be added to the reaction medium in various forms, e.g., nitrogen oxide vapors such as nitric oxide, nitrogen dioxide, nitrogen tetraoxide, etc., can be introduced into contact with the reaction medium during the oxidation to fix the aforementioned nitrogen oxide content therein or soluble nitrate or nitrite salts such as sodium nitrate, lithium nitrate, lithium nitrite, potassium nitrate, cesium nitrate, etc., can be added to the reaction medium.

Figure 2:
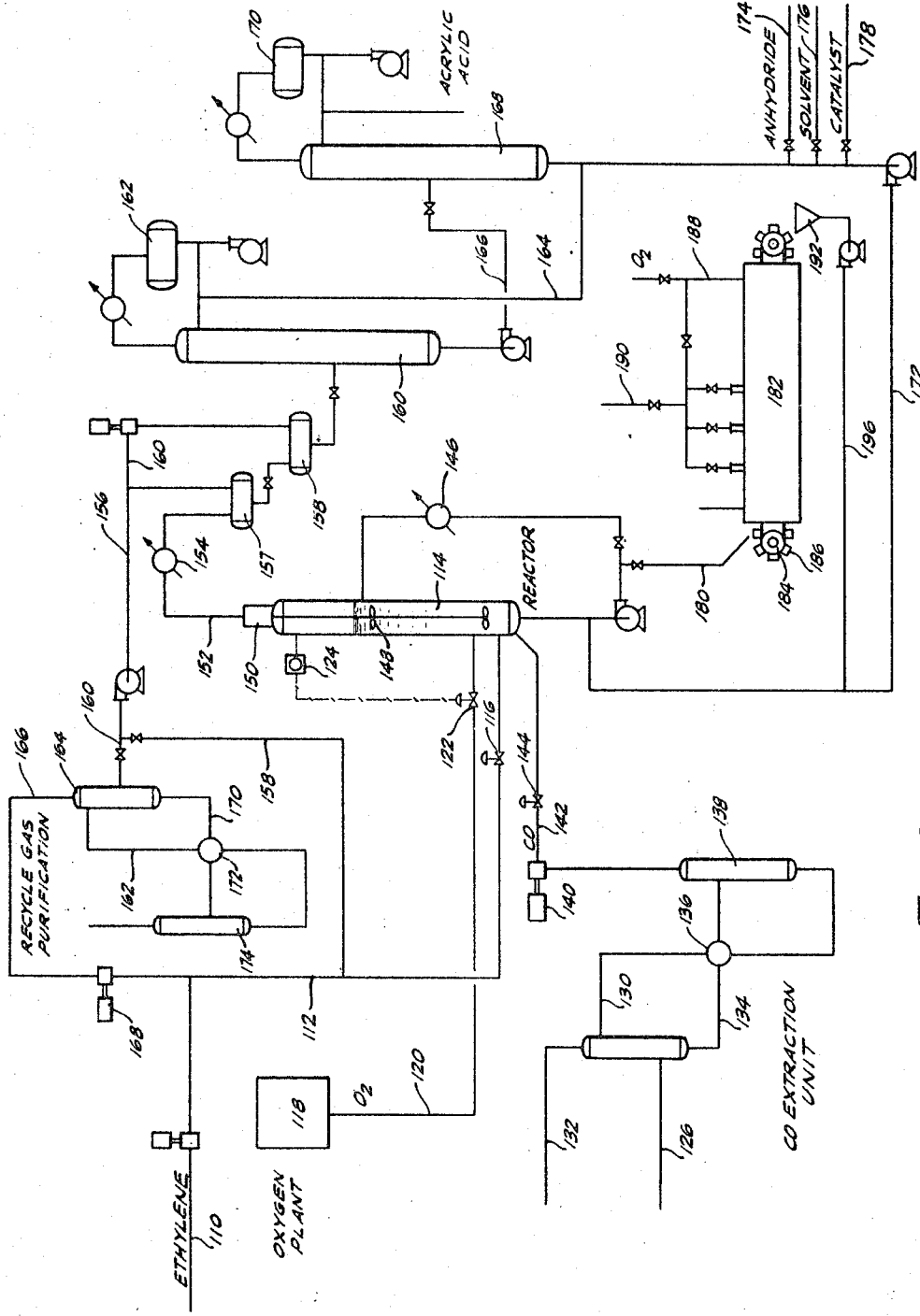

The best mode of practicing the invention will now be illustrated by a reference to the figures of which:

FIGURE 1 illustrates a process for the production of unsaturated esters and in particular vinyl acetate from olefins such as ethylene; and FIGURE 2 illustrates a method of oxidative carbonylation for olefins.

Referring now to FIGURE 1, ethylene is introduced into the process through line 10 by compressor 12 and mixes with the recycle gas in line 14. The mixed gases are introduced into the reactor 16 through a suitable control valve 18 which is set to provide the desired flow rate of the oxidizable material. An oxygen plant is provided at 20 to provide a stream of oxygen through line 22 which is introduced into reactor 16 through flow control valve 24 which is controlled by gas analyzer 26. This gas analyzer determines the elemental oxygen content of the gases in the vapor space of the reactor or in the vaporous effluent removed therefrom. Preferably, this controller is set to control the rate of introduction of oxygen so as to prevent the oxygen content of the gaseous effluent from exceeding about 2 or 3 volume percent and most preferably to maintain the elemental oxygen content less than 1 volume percent. The reaction zone is maintained under substantially anhydrous conditions and sufficient pressure is employed to maintain a liquid phase within the reactor.

The reaction conditions within the reactor are relatively mild; temperatures from about 30° to about 300° C. and preferably from about 50° to about 125° C. are employed. The reactor pressure is maintained from about 10 to about 1000 atmospheres and the use of higher pressures is preferred because the increased pressure favors solubility of the olefin in the reaction solvent. Preferably, reaction pressures from about 50 to about 750 atmospheres are employed. The reaction zone contents are maintained under agitation by a suitable mixer such as the propeller mixer 28 which is rotated by power means such as motor 30 that is mounted outside the vessel.

The olefin is supplied in a large excess in the processing scheme illustrated in FIGURE 1 and this excess of olefin serves to sweep the oxidized products out of the reactor through overhead line 32. The products are cooled in condenser 34 and passed to a high pressure separating zone 36 from which the gases, i.e., excess olefin, and the fixed gases such as carbon oxides, are removed through line 38 and recycled to the reactor through lines 40 and 14. A portion of the recycle gases is diverted to the recycle gas purification zone where it is contacted with an aqueous solution of monoethanolamine or other conventional adsorbent for the removal of carbon dioxide. The contacting is performed countercurrently in adsorption zone 44 and the purified recycle gases are removed overhead through line 46 and returned for recycling by recycle gas compressor 48. The solution of monoethanolamine is regenerated in zone 50 and the carbon oxides are removed through line 52. The regenerated solution is returned through line 42 in heat exchange relationship with the rich adsorbent solution removed from zone 44 through line 52.

The condensed liquids in zone 36 are removed through line 56 and passed to fractionation zone 58 where the low-boiling byproducts are removed therefrom. These low-boiling byproducts are condensed in cooler 60 and passed to product receiver 62. In this product receiver the low-boiling byproducts such as the butenes, methyl acetate, etc., are removed overhead as gases for further processing through line 64 and the condensed liquid phase which is chiefly acetaldehyde is removed through line 66 and used to reflux the fractionation zone 58. A portion of the product acetaldehyde is withdrawn through line 68 and all or a portion thereof can be returned to the oxidation zone through line 70 for oxidation in the reaction zone to acetic acid to replenish the acetic acid consumed in the formation of the vinyl acetate product. If desired, all or a portion of this acetaldehyde could also be removed through line 72 as a product of the oxidation zone or as an intermediate to be passed to a separate reaction zone where it is oxidized to acetic acid. The acetic acid is then returned to the oxidation process to replenish the acetic acid consumed in the formation of the vinyl acetate.

The bottoms from the fractionation zone 58 are then further fractionated in product fractionator 74 where the desired vinyl acetate product is recovered in a high degree of purity through overhead line 76, condensed and collected in product receiver 78. The vinyl acetate is employed to reflux fractionation zone 74 and a portion thereof is recovered as vinyl acetate product. Product receiver 78 is preferably combined with a phase separator by the positioning of a weir 80 within the vessel to permit separation of an aqueous and organic phase. The aqueous phase is removed through line 82 as a vinyl acetate rich aqueous stream which is passed to further processing for the recovery of all vinyl acetate values therefrom.

The particular improvement which concerns this invention comprises the maintaining of the catalyst activity within reaction zone 16. We have observed that during the processing of the olefin there occurs an accumulation of high-boiling residue which is chiefly polyvinyl acetate. To prevent the accumulation of this high-boiling residue to an objectionable level, a portion of the contents of the reaction zone are withdrawn through line 84 and passed to the catalyst recovery where the organic portion is burned and an ash containing the catalyst metals is recovered and returned directly to the reaction zone. This is illustrated by passing all or a portion of the withdrawn reaction medium to a separation zone 86 which can comprise an atmospheric or vacuum distillation zone where a tarry residue is separated from a clear, lower boiling solvent. The lower boiling components are returned through line 88 to the reactor and the tarry residue is passed through line 90 to a combustion zone 92. As previously mentioned, separation in zone 86 is optional and if desired the withdrawn reaction medium can be passed directly to the oxidation zone through line 94.

The particular oxidation zone illustrated comprises a rotating kiln where the tarry residue is sprayed onto a bed of ash and wherein oxygen is introduced through line 96 to support combustion of the tarry residue. The combustion is maintained at the surface of the ash. If necessary, a suitable fuel gas can be introduced through 98 to maintain the necessary combustion temperature. The ash is discharged from the rotating kiln into hopper 100 and a suitable carrier liquid, preferably fresh reaction medium, is introduced through line 102 to provide a pumpable slurry of the ash which is then returned through line 104 to the reaction zone. The necessary quantities of makeup catalyst components such as the halides, alkali metal salts, etc., are supplied through line 106 and the necessary quantities of fresh reaction medium and acetic acid reactant are introduced through line 108.

The high-boiling fraction from the product fractionation zone 74 is removed through line 75 and a portion thereof can be recycled to the reaction zone through line 77. The majority of this high-boiling fraction comprises acetic acid which was removed with the product from reaction zone 16. This acetic acid also contains quantities of high-boiling byproducts such as propionic acid and vinyl propionate. All or a portion of this liquid stream can be passed to further processing through line 79 for the recovery of these byproducts to obtain a purified acetic acid which is then returned to the reaction zone.

FIGURE 2 illustrates the oxidative carbonylation to which our catalyst recovery method can also be applied. In this oxidative carbonylation an olefin such as ethylene is introduced through line 110 and is admixed with the recycle gas in line 112 and passed to the reactor 114. The rate of introduction of the olefin into reactor 114 is controlled by flow control valve 116. An oxygen plant 118 provides a suitable source of oxygen through line 120 and the rate of introduction of oxygen into the reaction zone is controlled by flow control valve 122 which responds to the free oxygen content of the gases in the reactor or the vapor effluent removed therefrom as determined by gas analyzer and controller 124. Preferably, the rate of oxygen introduction is controlled to limit the free oxygen content of this vapor stream to less than 3 and most preferably less than 1 volume percent.

A gas rich in carbon monoxide can be obtained from various natural gas reforming furnaces and this gas is introduced through line 126. The gas is contacted countercurrently in adsorption zone 128 with the lean cuprous acetate solution introduced through line 130 and a pure hydrogen stream is removed through line 132. The rich adsorbent is removed through line 134, heated in heat exchanger 136 and passed to stripping zone 138 where the carbon monoxide is volatilized and removed from the cuprous acetate solution. The lean cuprous acetate is then removed and returned to the adsorption zone 128. The carbon monoxide stream is then passed by compressor 140 through line 142 and flow control valve 144 into reactor 114.

Reaction 114 is maintained under substantially anhydrous conditions and at relatively mild temperatures between about 30° and 300° C.; preferably between about 50° and 150° C. This temperature is maintained with the exothermic reaction by circulating all or a portion of the reaction medium through cooler 146 or, if desired, a cooling coil can be positioned internally of the reactor itself. The reaction zone is maintained under liquid phase conditions and the liquid contents and the liquid phase is stirred by propellers 148 which are rotated by motor 150 that can be mounted externally of the vessel.

The products are swept from reactor 114 by circulating a large excess of ethylene and carbon monoxide therethrough. The products are removed as a vaporous effluent through line 152, cooled in condenser 154 and passed to a high pressure accumulator from which the gases are removed through line 156 and returned to the reaction zone through recycle line 158. A portion of the recycle gas stream can be diverted through line 160 to a recycle gas purification zone which is any conventional system for the recovery of carbon dioxide from gas streams. This is illustrated as an aqueous solution of monoethanolamine which is introduced through line 162 into countercurrent contact with the recycle gas in adsorber 164. The purified gas is removed through line 166 and returned through recycle gas compressor 168 to the reaction zone for further processing. The enriched monoethanolamine solution is withdrawn through line 170, heated through heat exchanger 172 and passed to stripper 174 where the carbon dioxide is removed and the lean monoethanolamine solution is removed for return to the adsorption zone. The liquid contents of high pressure accumulator 157 are passed to a second accumulator 158 at a lower pressure and the dissolved ethylene contained in this stream is removed therefrom and returned for further processing to the reaction zone through compressor 160.

The liquid contents of low pressure accumulator 158 are passed into fractionation zone 160 where the acetic acid is vaporized and recovered in product receiver 162. This acetic acid is reutrned to the reaction zone through line 164. The liquid residue from this fractionation zone 160 is passed through line 166 to fractionation zone 168 wherein the desired product, i.e., acrylic acid, is recovered as product in product recevier 170 and the high-boiling fractions such as beta acetoxy propionic acid, high boiling acids and anhydrides are recycled to the reaction zone through line 172. The necessary makeup components of the reaction medium are introduced into this recycle line such as acetic anhydride through line 174, fresh solvent acetic acid or pivalic acid through line 176 and fresh catalyst components such as additional halide or any of the necessary catalyst salts is introduced through line 178.

The particular improvement which concerns our invention comprises the maintaining of the activity of the reaction medium in reactor 114 by removing a portion of the reaction medium from the remainder of this medium through line 180 and passing this material to a suitable combustion zone 182 wherein the organic portion of the removed reaction medium is burned to produce an ash containing the catalyst components that can be recovered and directly returned to the oxidation zone. If desired, the withdrawn portion can be distilled at atmospheric or reduced pressures to recover the lower boiling components which are returned to the reaction zone and the distillation residue is passed to zone 182. Combustion zone 182 is illustrated as a furnace having a conveyor belt 184 with open pans 186 positioned therein. The reaction medium can be introduced into the open pans and passed into the furnace wherein it is heated to combustion temperatures and contacted with an oxygen-containing gas that is introduced through line 188. This oxygen can be pure or diluted oxygen, e.g., air or mixtures of air with inert gases. If necessary to maintain the desired temperature, a fuel gas can be introduced through line 190.

The ash produced in furnace 182 is discharged therefrom into hopper 192 and a suitable carried liquid such as fresh reaction medium is admixed with the ash and pumped through line 196 for return to the reaction zone.

The results obtainable by the practice of our invention will be demonstrated by the following examples:

Example 1

Ethylene was oxidized in a continuous process with a reaction vessel 36 inches long by 2.5 inches internal diameter. The vessel contained an internal stirring plate and a heat exchange coil to maintain a constant reaction temperature. The liquid level in the reactor was adjusted at 500 milliliters and the effluent comprising a mixture of gas and liquid phases was withdrawn through a dip tube inserted in the reactor. The effluent was passed through a cooler into a separator from which the gas phase was removed and returned for further contacting in the reaction zone. A liquid product was distilled in a laboratory distillation unit to recover the products and volatile by-products therefrom and the residue from the distillation was returned to the reaction zone to maintain the liquid level therein. The reaction medium employed for the oxidation was acetic acid that was supplied to the reactor at 2000 milliliters per hour, thereby providing a 15 minute residence time for the liquid in the reaction zone. The reactor was maintained under 750 p.s.i.g. by the supply of ethylene thereto at an average rate throughout the reaction period of 280 liters per hour. Oxygen was separately introduced into the reactor at a rate controlled by an oxygen analyzer which was set to maintain the elemental oxygen content of the gas phase of the reactor at one volume percent. During the run the average rate of oxygen introduction was 110 liters per hour. The oxidation was continued for 125 hours to permit repeated recycling of the reaction medium.

The average yield of products produced during this oxidation was as follows:

TABLE 1

| Product: | Yield, mol percent of consumed ethylene |
|---|---|
| Carbon dioxide | 4.3 |
| Butenes | 2.6 |
| Formaldehyde | 0.8 |
| Acetaldehyde | 13.1 |
| Methyl acetate | 0.7 |
| Vinyl acetate | 48.8 |
| Acetic acid | 20.0 |
| Ethylidene diacetate | 0.6 |
| Glycol diacetate | 0.4 |
| Propionic acid | 7.5 |
| Vinyl propionate | 1.2 |

The composition of the reaction medium initially charged was as follows:

TABLE 2

| Component: | Grams |
|---|---|
| Acetic acid | 1000 |
| Sodium chloride | 10 |
| Sodium acetate trihydrate | 13.5 |
| Cupric acetate monohydrate | 12 |
| Palladous chloride | 1 |
| Finely divided silica | 20 |
| Ammonium vanadate | 1 |

Upon completion of the experiment, a portion of the reaction medium was removed and filtered and distilled to determine the boiling point composition. The distillation was continued to a bottoms temperature of 350° F. at which point 84 percent of the charge had been removed overhead. This residue was vacuum distilled to separate the high-boiling components from the catalyst residue and tar and the volatile fraction from the vacuum distillation was fractionated. The bottoms from the vacuum distillation was a tarry residue that comprised from 3 to 4 weight percent of the original reaction medium and was found by infrared analysis to be comprised chiefly of polyvinyl acetate. This material was a highly viscous and tacky liquid that adhered strongly to the vessel surfaces.

When the high-boiling residue obtained in the atmospheric fractionation, boiling point 350° F., is placed in an open pan, e.g., laboratory evaporating dish, and burned with an open flame, an ash is obtained that comprises approximately 5–10 weight percent of the liquid residue. This ash can be returned directly to the oxidation zone and reused directly in the vinyl acetate oxidation.

Example 2

The following example demonstrates the application of our invention to an oxidative carbonylation reaction. The oxidation was performed in a one-gallon autoclave to which was charged 150 grams acetic acid, 150 grams acetic anhydride, 300 grams pivalic acid, 1 gram palladous chloride, 5 grams lithium chloride, 5 grams lithium acetate dihydrate and 5 grams cupric chloride. The autoclave was closed and pressured to 450 p.s.i.g. with ethylene and then an additional 450 p.s.i.g. of carbon monoxide was introduced. The mixture was heated to 280° F. and oxygen and nitrogen were added during a 10-minute period. Upon completion of the reaction period the crude reaction product was removed and distilled at 20 millimeters mercury pressure to recover 505 grams of a distillate having the following composition:

| | |
|---|---|
| Acetic acid | 57.7 |
| Pivalic acid | 30.1 |
| Acrylic acid | 12.2 |

The bottoms recovered from the distillation were employed in a repeat experiment by the addition of 93 grams acetic anhydride, 147 grams pivalic acid, 2 grams lithium chloride and 205 grams acetic acid. The reconstituted reaction medium was charged to the autoclave and the experiment repeated for a 7-minute reaction period. The product was distilled at 20 millimeters mercury pressure to recover 456 grams of a distillate having the following composition:

| | |
|---|---|
| Acetic acid | 61.1 |
| Pivalic acid | 26.0 |
| Acrylic acid | 11.6 |
| Other | 1.3 |

The bottoms comprising 208 grams were admixed with 110 grams pivalic acid, 101 grams acetic anhydride, 1 gram lithium chloride and 196 grams acetic acid and the reconstituted reaction medium was recharged to the autoclave in a repeat experiment. The repeated oxidation was performed under identical conditions to the preceding oxidation and the crude reaction product was distilled at 20 milliliters mercury pressure to obtain 393 grams of distillate and 226 grams of a residue. The distillate had the following composition:

| | |
|---|---|
| Acetic acid | 72.4 |
| Pivalic acid | 17.1 |
| Acrylic acid | 10.5 |

The residue from the distillation weighed 226 grams and to this residue was added 98 grams pivalic acid, 84 grams acetic anhydride, 1 gram lithium chloride and 215 grams acetic acid and the mixture was recharged to the oxidation zone in a repeat experiment which was conducted for a 10-minute period. The product was distilled at 20 millimeters mercury to recover 400 grams of a distillate having the following composition:

| | |
|---|---|
| Chloromethyl acetate | 1.4 |
| Acetic acid | 52.3 |
| Pivalic acid | 33.3 |
| Acrylic acid | 7.7 |
| Other | 5.3 |

The residue from the vacuum distillation was a viscous liquid which was decanted to separate 122 grams of a clear liquid from 42 grams of a tarry residue. The tarry residue was placed in an evaporating dish and was burned at atomspheric pressure by directing a burner flame to the surface of the liquid to initiate combustion. The complete combustion of the tarry residue yielded an ash which was used in a repetitive oxidation. This oxidation was performed by introducing 400 grams acetic acid, 100 grams acetic anhydride and 7 grams of the ash product into the autoclave. The autoclave was pressured to 450 p.s.i.g. with ethylene with an additional 450 p.s.i.g. with carbon monoxide. The autoclave was heated to 300° F. and oxygen and nitrogen were added intermittently over a 15-minute period. Upon completion of the oxidation the autoclave was opened and the crude product distilled at atmospheric pressure to obtain 398 grams distillate at 140° bottoms temperature. The residue from the atmospheric distillation was then distilled under vacuum at 20 milliliters mercury to a bottoms temperature of 150° F. The distillate obtained from this distillation weighed 122 grams and had the following composition:

| | |
|---|---|
| Acetic anhydride | 24.0 |
| Acetic acid | 45.1 |
| Pivalic acid | 4.1 |
| Acrylic acid | 22.7 |
| Other | 4.1 |

The preceding examples are intended solely to illustrate the best mode of practicing our invention and to demonstrate the results obtainable thereby. It is not intended that these examples are to be unduly limiting of the invention but rather than the invention is to be defined by the steps and reagents and their obvious equivalents set forth in the following claims:

We claim:

1. In the oxidation of a hydrocarbon olefin having 2 to about 10 carbons to an oxygenated product thereof wherein the olefin is introduced into a reaction zone to contact, under substantially anhydrous conditions, a reaction medium comprising a low molecular weight alkanoic acid; said medium containing a catalyst comprising from 0.001 to 5.0 weight percent of a platinum group metal in a positive oxidation state, from 0.1 to 5.0 weight percent of an alkali metal salt of said alkanoic acid and containing a redox agent selected from the group consisting of from 0.01 to 3 weight percent of a soluble salt of nitrogen oxide and of from 0.1 to 10 weight percent of a multivalent metal having an oxidation potential more positive than said platinum group metal and mixtures thereof and wherein the reaction medium is contacted with oxygen to maintain said catalyst in said state; the improved method for preventing permanent deactivation of the catalyst that comprises separating a reaction medium portion containing byproduct tar and catalyst from the remainder of the reaction medium, contacting the byproduct tar and catalyst of the separated portion with oxygen and initiating combustion to obtain an inorganic ash product and returning the inorganic ash from the combustion to the reaction zone.

2. The oxidation of claim 1 for the preparation of vinyl acetate wherein said olefin is ethylene wherein said carboxylic acid is acetic acid and wherein said reaction medium also contains from 0.1 to 5.0 weight percent of an alkali metal acetate and from 0.5 to 5.0 weight percent of a soluble bromide or chloride.

3. The oxidation of claim 1 wherein said redox agent is cuprous chloride.

4. The oxidation of claim 1 wherein said redox agent comprises a mixture of cupric chloride and a soluble nitrogen oxide salt.

5. The oxidation of claim 1 wherein said oxygen and olefin are simultaneously introduced into a single reaction zone.

6. The oxidation of claim 1 wherein a viscous tarry fraction is separated from said separated reaction medium and is contacted with oxygen under combustion conditions to obtain an inorganic ash product.

7. The oxidation of claim 6 wherein said tarry fraction is first subjected to destructive distillation to recover valuable organic compounds therefrom before said tarry fraction is subjected to combustion with oxygen.

8. The oxidation of claim 1 wherein the flow rate of said removed portion of said reaction medium is 1–20% of the flow rate of said reaction medium.

9. In the oxidation of a hydrocarbon olefin having 2 to about 10 carbons to an oxygenated product thereof wherein the olefin and carbon monoxide are introduced into a reaction zone to contact, under substantially anhydrous conditions, a reaction medium comprising a low molecular weight alkanoic acid; said medium containing a catalyst comprising from 0.001 to 5.0 weight percent of a platinum group metal in a positive oxidation state, and containing a redox agent selected from the group consisting of from 0.01 to 3 weight percent of a soluble salt of nitrogen oxide and of from 0.1 to 10 weight percent of a multivalent metal having an oxidation potential more positive than said platinum group metal and mixtures thereof and wherein the reaction medium is contacted with oxygen to maintain said catalyst in said state; the improved method for preventing permanent deactivation of the catalyst that comprises separating a reaction medium portion containing byproduct tar and catalyst from the remainder of the reaction medium, contacting the byproduct tar and catalyst of the separated portion with oxygen and initiating combustion to obtain an inorganic ash product and returning the inorganic ash from the combustion to the reaction zone.

10. The oxidation of claim 9 wherein said olefin is ethylene, wherein carbon monoxide is also introduced into contact with the reaction medium, wherein said carboxylic acid is acetic acid, and wherein a soluble chloride or bromide is also present.

11. The oxidation of claim 9 wherein said redox agent is cuprous chloride.

12. The oxidation of claim 9 wherein said oxygen and olefin are simultaneously introduced into a single reaction zone.

13. The oxidation of claim 9 wherein a viscous tarry fraction is separated from said separated reaction medium and is contacted with oxygen under combustion conditions to obtain an inorganic ash product.

14. The oxidation of claim 13 wherein said tarry fraction is first subjected to destructive distillation to recover valuable organic compounds therefrom before said tarry fraction is subjected to combustion with oxygen.

15. The oxidation of claim 9 wherein the flow rate of said removed portion of said reaction medium is 1–20% of the flow rate of said reaction medium.

References Cited

UNITED STATES PATENTS

| | | | |
|---|---|---|---|
| 2,963,445 | 12/1960 | Nixon | 252—416 |
| 3,206,413 | 9/1965 | Leopard | 252—416 |
| 3,243,384 | 3/1966 | Raarup | 252—416 |
| 3,260,739 | 7/1966 | Schaeffer. | |
| 3,349,119 | 10/1967 | Fenton et al. | |

FOREIGN PATENTS

| | | |
|---|---|---|
| 608,610 | 3/1962 | Belgium. |
| 735,145 | 8/1955 | Great Britain. |
| 966,809 | 8/1964 | Great Britain. |

LORRAINE A. WEINBERGER, Primary Examiner

V. GARNER, Assistant Examiner

U.S. Cl. X.R.

252—416; 260—533, 597, 604

UNITED STATES PATENT OFFICE
CERTIFICATE OF CORRECTION

Patent No. 3,461,157 August 12, 1969

Kenneth L. Olivier et al.

It is certified that error appears in the above identified patent and that said Letters Patent are hereby corrected as shown below:

Column 12, line 14, "0.5" should read -- 0.05 --.

Signed and sealed this 21st day of April 1970.

(SEAL)
Attest:

Edward M. Fletcher, Jr.
Attesting Officer

WILLIAM E. SCHUYLER, JR
Commissioner of Patents